(12) United States Patent
Inzunza et al.

(10) Patent No.: US 10,560,206 B2
(45) Date of Patent: Feb. 11, 2020

(54) PROCESSING A BEAMFORMED RADIO FREQUENCY (RF) SIGNAL

(71) Applicant: VIAVI Solutions Inc., San Jose, CA (US)

(72) Inventors: Eduardo Inzunza, San Jose, CA (US); Se-Young Eun, Seoul (KR); Jong-Min Kim, Seoul (KR); Byung-Kuk An, Seoul (KR); Jin-Ook Kim, Seoul (KR); Joe Chou, Riverside, CT (US); Eng Wei Koo, Colorado Springs, CO (US)

(73) Assignee: VIAVI Solutions Inc., San Jose, CA (US)

( * ) Notice: Subject to any disclaimer, the term of this patent is extended or adjusted under 35 U.S.C. 154(b) by 0 days.

(21) Appl. No.: 16/189,542

(22) Filed: Nov. 13, 2018

(65) Prior Publication Data

US 2019/0181971 A1    Jun. 13, 2019

Related U.S. Application Data

(60) Provisional application No. 62/597,780, filed on Dec. 12, 2017.

(51) Int. Cl.
*H04B 17/391* (2015.01)
*H04B 17/327* (2015.01)
(Continued)

(52) U.S. Cl.
CPC ......... *H04B 17/391* (2015.01); *H04B 7/0617* (2013.01); *H04B 17/27* (2015.01);
(Continued)

(58) Field of Classification Search
CPC .... H04B 17/391; H04B 17/27; H04B 7/0617; H04B 17/336; H04B 17/327; H04B 17/318
(Continued)

(56) References Cited

U.S. PATENT DOCUMENTS

| 7,020,701 | B1 | 3/2006 | Gelvin et al. |
| 7,797,367 | B1 | 9/2010 | Gelvin et al. |

(Continued)

FOREIGN PATENT DOCUMENTS

| EP | 2469752 A1 | 6/2012 |
| EP | 2469761 A1 | 6/2012 |

(Continued)

OTHER PUBLICATIONS

Arnd Sibila et al., "5G NR network deployment is now—let's test!", Oct. 2018, 59 pages.

(Continued)

*Primary Examiner* — Juan A Torres
(74) *Attorney, Agent, or Firm* — Harrity & Harrity, LLP

(57) ABSTRACT

A device may receive a beamformed wireless signal from a base station. The device may perform a frequency conversion of the beamformed wireless signal to form a frequency converted signal after receiving the beamformed wireless signal. The device may perform, after performing the frequency conversion, processing related to at least one of: analyzing the frequency converted signal, scanning a channel associated with the frequency converted signal, or generating a map related to the frequency converted signal. The device may generate, after performing the processing, output related to at least one of: the analyzing the frequency converted signal, the scanning the channel, or the generating the map.

20 Claims, 12 Drawing Sheets

(51) Int. Cl.
    *H04B 17/336*     (2015.01)
    *H04B 7/06*     (2006.01)
    *H04B 17/27*     (2015.01)
    *H04B 17/318*     (2015.01)

(52) U.S. Cl.
    CPC ......... *H04B 17/327* (2015.01); *H04B 17/336* (2015.01); *H04B 17/318* (2015.01)

(58) Field of Classification Search
    USPC ...................................................... 375/262
    See application file for complete search history.

(56) References Cited

U.S. PATENT DOCUMENTS

| | | | |
|---|---|---|---|
| 10,142,276 | B2 | 11/2018 | Rapaport et al. |
| 2012/0155324 | A1* | 6/2012 | Janakiraman .......... H04L 41/12 370/254 |
| 2012/0159151 | A1* | 6/2012 | Janakiraman ......... H04L 43/028 713/153 |
| 2013/0064279 | A1* | 3/2013 | Nielsen .................... H04B 3/50 375/227 |
| 2014/0080447 | A1 | 3/2014 | Janakiraman et al. |
| 2015/0181442 | A1* | 6/2015 | Zinevich .............. H04J 11/0023 455/424 |
| 2015/0327091 | A1* | 11/2015 | Curtin ................. H04L 43/0811 370/250 |
| 2016/0065419 | A1 | 3/2016 | Szilagyi et al. |
| 2016/0119796 | A1* | 4/2016 | Ho ........................ H01Q 21/29 370/328 |
| 2017/0215221 | A1 | 7/2017 | Segev et al. |
| 2017/0245175 | A1* | 8/2017 | Nambi Raj ........... H04W 24/08 |
| 2017/0347251 | A1 | 11/2017 | Kim et al. |
| 2018/0115958 | A1 | 4/2018 | Raghavan et al. |
| 2018/0321687 | A1 | 11/2018 | Chambers et al. |
| 2019/0109810 | A1 | 4/2019 | Rapaport et al. |
| 2019/0132066 | A1 | 5/2019 | Park et al. |
| 2019/0182800 | A1 | 6/2019 | Park et al. |

FOREIGN PATENT DOCUMENTS

| | | |
|---|---|---|
| EP | 2945317 A1 | 11/2015 |
| WO | 2015095846 A2 | 6/2015 |
| WO | 2016091298 A1 | 6/2016 |

OTHER PUBLICATIONS

Arnd Sibila, "5G: initial 5GTF coverage measurements (part 2)" https://blog.mobile-network-testing.com/market-technology-trends/evolving-technologies/5g-coverage-measurements/, Jun. 12, 2018, 6 pages.

Rohde Schwarz, "Signal & Spectrum Analyzers", https://www.youtube.com/playlist?list=PLKxVoO5jUTIsxZXja8m6AH-02pBvHdGrE, Oct. 10, 2018, 10 pages.

Rohde Schwarz, "Network Analyzers", https://www.youtube.com/playlist?list=PLKxVoO5jUTItV9g-mf65Rj7v8uQ0F9TwW, Mar. 19, 2018, 7 pages.

GSM Association, "Mobile World Congress Americas 2017, San Francisco", https://www.gsma.com/futurenetworks/events-and-webinars/mwc-americas-san-francisco/, Sep. 12, 2017, 9 pages.

3GPP, "3GPP TS 37.340 3rd Generation Partnership Project; Technical Specification Group Radio Access Network; Evolved Universal Terrestrial Radio Access (E-UTRA) and NR; Multiconnectivity; Stage 2 (Release 15)," www.3gpp.org/DynaReport/37340.htm, Sep. 2018, 59 pages.

3GPP, "3GPP TS 38.401 3rd Generation Partnership Project; Technical Specification Group Radio Access Network; NG-RAN; Architecture description (Release 15)," www.3gpp.org/DynaReport/38401.htm, Sep. 2018, 39 pages.

3GPP, "3rd Generation Partnership Project; Technical Specification Group Radio Access Network; Evolved Universal Terrestrial Radio Access Network (E-UTRAN); X2 application protocol (X2AP) (Release 15)," https://portal.3gpp.org/desktopmodules/specifications/specificationsDetails.aspx?specificationsid=2452, Sep. 2018, 401 pages.

3GPP, "3rd Generation Partnership Project; Technical Specification Group Radio Access Network; NR; Radio Resource Control (RRC) protocol specification (Release 15)," https://portal.3gpp.org/desktopmodules/specifications/specificationsDetails.aspx?specificationsid=3197, Sep. 2018, 445 pages.

3GPP, "3rd Generation Partnership Project; Technical Specification Group Radio Access Network; Study on eNB(s) Architecture Evolution for E-UTRAN and NG-RAN (Release 15)," https://portal.3gpp.org/desktopmodules/Specifications/SpecificationDetails.aspx?specificationId=3365, Mar. 2018, 15 pages.

3GPP, "3rd Generation Partnership Project; Technical Specification Group Radio Access Network; Study on New Radio Access Technology; Radio Interface Protocol Aspects (Release 14)," https://portal.3gpp.org/desktopmodules/Specifications/SpecificationDetails.aspx?specificationId=3070, Mar. 2017, 57 pages.

3GPP, "Scheduling and HARQ support for NR CA," https://portal.3gpp.org/ngppapp/CreateTdoc.aspx?mode=view&contributionId=799570, Jun. 30, 2017, 4 pages.

3GPP, "Clarification on Desired Buffer Size," https://portal.3gpp.org/ngppapp/CreateTdoc.aspx?mode=view&contributionId=845969, Dec. 1, 2017, 6 pages.

3GPP, "On the Details of CSI Acquisition," http://www.3gpp.org/ftp/tsg_ran/wg1_ri1/TSGR1_AH/NR_AH 1706/Docs/, Jun. 30, 2017, 3 pages.

3GPP, "PUCCH resource allocation," http://www.3gpp.org/ftp/tsg_ran/wg1_ri1/TSGR1_AH/NR_AH 1706/Docs/, Jun. 30, 2017, 3 pages.

3GPP, "Test Scope for NR Initial Access and Beam Management at FR2," https://portal.3gpp.orgngppapp/CreateTdoc.aspx?mode=view&contributionId=842909, Dec. 1, 2017, 6 pages.

Etsi, "Digital Cellular Telecommunications System (Phase 2+)," https://www.etsi.oprg/deliver/etsits/133400_133499/08.02.01_60/ts_133401v080201p.pdf,. Jan. 2009, 60 pages.

Extended European Search Report for Application No. EP18208725.4, dated Jan. 31, 2019, 9 pages.

Rohde & Schwarz, "R&S® TSME6 Ultracompact Drive Test Scanner; All bands, all technologies, Simultaneously, Future-Proof Upgradability," http://cdn.rohde-schwarz.com/pws/dl_downloads/dl_common_library/dl_brochure_and_datasheets/pdf_1/service_support_30/TSME6_bro_en_3607.873-12_v0201.pdf, Jun. 28, 2018, 16 pages.

Sanjole, Inc., "WaveJudge 5000 LTE Analyzer," http://www.sanjole.com/our-products/lteanalyzer/, Dec. 2, 2008, 2 pages.

SGLLABS, "GenComm (JDSU), GC747A," https://www.sglabs.it/en/product.php?s=gencommjdsu-gc747a&id=1822, Oct. 12, 2018, 20 pages.

Telecomsource, "LTE Security Architecture," http://www.telecomsource.net/entry.php?658-LTE-Security-Architecture&style=12, Retrieved on Jul. 12, 2018, 3 pages.

Via Vi Solutions Inc., "AriesoGEO," https://www.viasolutions.com/en-us/product-family/ariesogeo, Nov. 24, 2015, 8 pages.

Via Vi Solutions Inc., "CellAdvisor," https://www.viasolutions.com/en-us/product-family/celladvisor, Jun. 19, 2016, 9 pages.

Via Vi Solutions Inc., "Get geo-located, App-Aware Insight," https://www.viavisolutions.com/en-us/solutions-time-intelligence/nitro/nitro-mobile, Feb. 2018, 4 pages.

Via Vi Solutions Inc., "T-BERD/MTS-5800 Handheld Network Tester," https://www.viavisolutions.com/en-us/products/t-berd-mts-5800-handheld-network-tester, Sep. 12, 2016, 5 pages.

Via Vi Solutions Inc., "xSIGHT," https://www.viasolutions.com/en-us/product-family-xsight, May 17, 2014, 5 pages.

Wikipedia, "Drive Testing," https://en.wikipedia.org/wiki/Drive_testing, Sep. 22, 2010, 3 pages.

Extended European Search Report for Application No. EP18211705.1, dated Apr. 11, 2019, 12 pages.

(56) References Cited

OTHER PUBLICATIONS

3GPP, "3rd Generation Partnership Project; Technical Specification Group Services and System Aspects; Study of Enablers for Network Automation for 5G; (Release 16)", 3GPP Standard, Technical Report, 3GPP TR 23.791, 3rd Generation Partnership Project (3GPP), France, vol. SA WG2 (V0.3.0), May 2, 2018, pp. 1-19, XP051451264, pp. 1-16, [retrieved on May 2, 2018].

3GPP, "3rd Generation Partnership Project; Technical Specification Group Services and System Aspects; Study on Cellular IoT support and evolution for the 5G System (Release 16)", 3GPP Standard, Technical Report, 3GPP TR 23.724, 3rd Generation Partnership Project (3GPP), Mobile Competence Centre, 650, Route Des Lucioles, F-06921 Sophia-Antipolis Cedex, France, vol. SA WG2 (V0.3.0), May 2, 2018, pp. 1-154, pp. 86-89, XP051451260, [retrieved on May 2, 2018].

International Search Report and Written Opinion for the Application No. PCT/US2019/031581, dated Oct. 1, 2019, 15 pages.

* cited by examiner

PROCESSING A BEAMFORMED RADIO FREQUENCY (RF) SIGNAL

RELATED APPLICATION

This application claims priority under 35 U.S.C. § 119 to U.S. Provisional Patent Application No. 62/597,780, filed on Dec. 12, 2017, the content of which is incorporated by reference herein in its entirety.

BACKGROUND

A base station may transmit a beamformed radio frequency (RF) signal. Beamforming may include a signal processing technique used for directional signal transmission and/or reception. For example, beamforming may be achieved by combining elements in an antenna array such that an RF signal experiences constructive interference at a particular angle. Beamforming can be used at both the transmitting and receiving ends of the RF signal.

SUMMARY

According to some possible implementations, a method may comprise: receiving, by a device, a beamformed wireless signal from a base station; performing, by the device, a frequency conversion of the beamformed wireless signal to form a frequency converted signal after receiving the beamformed wireless signal; performing, by the device and after performing the frequency conversion, processing related to at least one of: analyzing the frequency converted signal, scanning a channel associated with the frequency converted signal, or generating a map related to the frequency converted signal; and generating, by the device and after performing the processing, output related to at least one of: the analyzing the frequency converted signal, the scanning the channel, or the generating the map.

According to some possible implementations, a device may comprise: one or more memories; and one or more processors, communicatively coupled to the one or more memories, configured to: receive a beamformed wireless signal from a base station; perform a frequency conversion of the beamformed wireless signal to form a frequency converted signal after receiving the beamformed wireless signal; determine a primary synchronization of the frequency converted signal after performing the frequency conversion; determine a cell identifier of a cell associated with the frequency converted signal after determining the primary synchronization; perform, after determining the cell identifier, first processing of the frequency converted signal related to analyzing the frequency converted signal; perform second processing of the frequency converted signal related to scanning a channel associated with the frequency converted signal; perform third processing related to generating a map related to the frequency converted signal after performing the second processing; and generate output related to the first processing after performing the first processing, related to the second processing after performing the second processing, or related to the third processing after performing the third processing.

According to some possible implementations, a non-transitory computer-readable medium may store instructions, the instructions comprising: one or more instructions that, when executed by one or more processors, cause the one or more processors to: receive a beamformed wireless signal from a base station; perform a frequency conversion of the beamformed wireless signal to form a frequency converted signal after receiving the beamformed wireless signal; determine a primary synchronization of the frequency converted signal after performing the frequency conversion; determine a cell identifier of a cell associated with the frequency converted signal after determining the primary synchronization; perform, after determining the cell identifier, processing related to at least one of: analyzing the frequency converted signal, scanning a channel associated with the frequency converted signal, or generating a map related to the frequency converted signal; and generate, after performing the processing, output related to at least one of: the analyzing the frequency converted signal, the scanning the channel, or the generating the map.

DETAILED DESCRIPTION

The following detailed description of example implementations refers to the accompanying drawings. The same reference numbers in different drawings may identify the same or similar elements.

A base station may transmit various beamformed wireless signals (e.g., beamformed radio frequency (RF) signals). A network technician may want to perform an analysis of the various beamformed wireless signals. For example, the network technician may want to perform the analysis of the various beamformed wireless signals to determine interference associated with the various beamformed wireless signals, to perform an analysis of metrics related to the various beamformed wireless signals, and/or the like.

Some implementations described herein provide a signal analyzer that is capable of processing a beamformed wireless signal. For example, the signal analyzer may be a handheld and/or portable device that can process the beamformed wireless signal to perform an analysis of the beamformed wireless signal, to scan a channel (e.g., an RF channel) associated with the beamformed wireless signal, and/or to generate a map related to the beamformed wireless signal. This facilitates troubleshooting related to the beamformed wireless signal, determination of metrics related to the beamformed wireless signal, and/or the like in real-time or near real-time in a manner not previously possible. In addition, use of the signal analyzer may facilitate improvement of network performance of a network, which may improve communications via the network. Further, use of the signal analyzer may facilitate fixing of an issue related to a beamformed wireless signal, thereby conserving processing resources that would otherwise be consumed by a device (e.g., a user device) attempting to use a beamformed wireless signal that includes an issue.

Figure 1A:
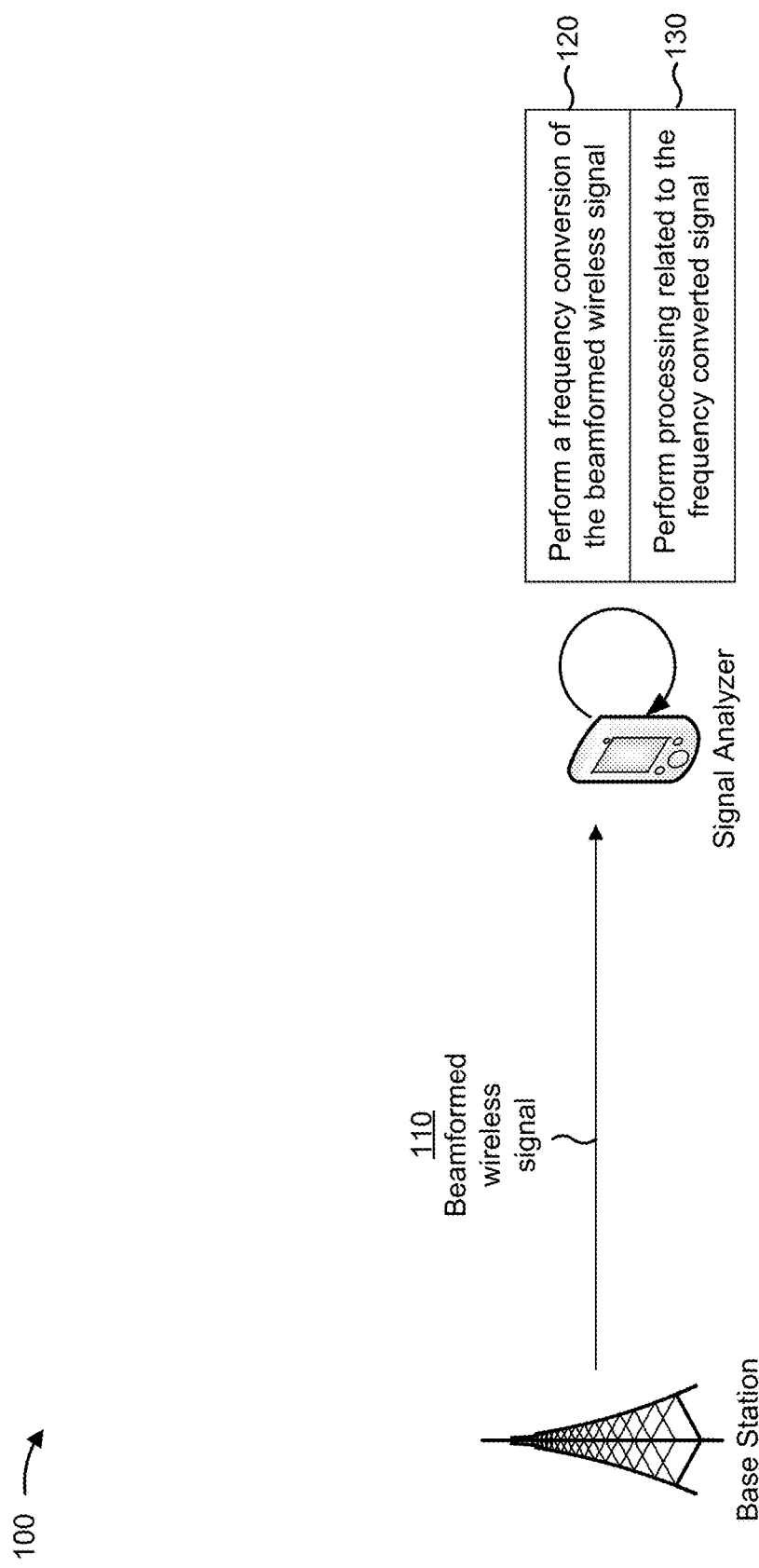
FIGS. 1A-1E are diagrams of an example implementation described herein.

FIGS. 1A-1E are diagrams of an example implementation 100 described herein. As shown in FIG. 1A, implementation 100 includes a base station and a signal analyzer. For example, the signal analyzer (e.g., a beam scanner, a radio frequency (RF) profiler, a carrier scanner, a beam analyzer, and/or the like) may include a handheld and/or portable device that is capable of processing a beamformed wireless signal from the base station to perform various analyses of the beamformed wireless signal and/or to generate various outputs related to the various analyses. Although implementation 100 may be described in the context of a single beamformed wireless signal, in reality, the signal analyzer may perform analyses and/or generate output in real-time or near real-time for tens, hundreds, or more beamformed wireless signals.

As shown by reference number 110, the base station may transmit, and the signal analyzer may receive, a beamformed wireless signal. For example, the base station may transmit, and the signal analyzer may receive, the beamformed wireless signal based on a device (e.g., a user device and/or the signal analyzer) connecting to the base station, according to a schedule, based on the signal analyzer (or another device) requesting that the base station transmit the beamformed wireless signal, and/or the like.

In some implementations, the signal analyzer may receive the beamformed wireless signal using an antenna associated with the signal analyzer. For example, the signal analyzer may receive the beamformed wireless signal using an omni-directional antenna.

As shown by reference number 120, the signal analyzer may perform a frequency conversion of the beamformed wireless signal. For example, the signal analyzer may perform a down conversion to form a frequency converted signal after receiving the beamformed wireless signal, based on receiving input via an input component associated with the signal analyzer to perform the frequency conversion, at a particular time after receiving the beamformed wireless signal, and/or the like.

In some implementations, the signal analyzer may perform the frequency conversion of the beamformed wireless signal from a first frequency domain to a second frequency domain (e.g., where the second frequency domain is a lower frequency domain relative to the first frequency domain). In some implementations, when frequency converting the beamformed wireless signal, the signal analyzer may demodulate the beamformed wireless signal, may modify a frequency of the beamformed wireless signal while maintaining a phase and/or an amplitude of the beamformed wireless signal, and/or the like. In some implementations, the signal analyzer may use a frequency converter associated with the signal analyzer to frequency convert the beamformed wireless signal. For example, the frequency converter may include one or more components configured to frequency convert a beamformed wireless signal.

In some implementations, the signal analyzer may perform an up conversion of the beamformed wireless signal rather than a frequency conversion. For example, the signal analyzer may perform the up conversion to form an up converted signal when the frequency domain of the beamformed wireless signal is lower than what is needed for processing by the signal analyzer.

In some implementations, the signal analyzer may perform an analog-to-digital conversion of the frequency converted signal. For example, the signal analyzer may perform a conversion of the frequency converted signal from an analog signal to a digital signal after performing the frequency conversion, based on receiving input to perform the analog-to-digital conversion of the frequency converted signal, at a particular time after performing the frequency conversion, and/or the like. In some implementations, the signal analyzer may perform the analog-to-digital conversion to facilitate processing of the frequency converted signal in the manner described elsewhere herein.

In some implementations, the signal analyzer may perform a spectrum analysis of the frequency converted signal. For example, the signal analyzer may perform a spectrum analysis (e.g., a time and/or frequency spectrum analysis) of the frequency converted signal after performing the frequency conversion of the beamformed wireless signal, such as to detect an existence of a particular beamformed wireless signal (e.g., which may have a short on/off switching period). In some implementations, when performing the spectrum analysis, the signal analyzer may determine a frequency of the frequency converted signal, a power of the frequency converted signal (e.g., in decibels (dBs)), a timing of the frequency converted signal (e.g., symbols in which the frequency converted signal was received), and/or the like. In some implementations, the signal analyzer may use a result of performing the spectrum analysis to generate a report, in association with another analysis, and/or the like, as described elsewhere herein.

In some implementations, the signal analyzer may determine a primary synchronization of the frequency converted signal. For example, the signal analyzer may determine the primary synchronization after performing the frequency conversion, after performing the spectrum analysis, based on input to the signal analyzer (e.g., from a user of the signal analyzer), at a particular time after performing the frequency conversion, and/or the like. In some implementations, the primary synchronization may be associated with a primary synchronization signal (PSS) and may facilitate synchronization of a device (e.g., a user device, the signal analyzer, and/or the like) on a subframe level. In some implementations, the signal analyzer may determine the primary synchronization from an orthogonal frequency division multiplexing (OFDM) symbol associated with the frequency converted signal. In some implementations, determining the primary synchronization may facilitate determination of a cell identifier, a time slot and/or frame synchronization of the frequency converted signal, and/or the like, which the signal analyzer may use to perform various analyses described herein.

In some implementations, the signal analyzer may determine a cell identifier associated with the frequency converted signal (e.g., a physical cell identifier (PCI), an identifier determined from a PSS and/or a secondary synchronization signal (SSS), a cell global identity (CGI) a cell ID (CID), and/or the like). For example, the signal analyzer may determine the cell identifier after determining the primary synchronization, based on receiving input form a user of the signal analyzer to determine the cell identifier, and/or the like. In some implementations, the cell identifier may facilitate cell-specific analysis and/or generation of output, as described elsewhere herein.

As shown by reference number 130, the signal analyzer may perform processing related to the frequency converted signal. For example, the signal analyzer may perform signal processing of the frequency converted signal after frequency converting the beamformed wireless signal, after determining the primary synchronization, after determining the cell identifier, and/or the like. In some implementations, the signal analyzer may perform processing related to analyzing the frequency converted signal, related to scanning a channel associated with the frequency converted signal, related to generating a map related to the frequency converted signal, and/or the like, as described in more detail elsewhere herein.

In some implementations, the signal analyzer may perform different types of processing (e.g., the analyzing, scanning, and/or generating described elsewhere herein) based on different input from a user of the signal analyzer (e.g., different input may cause the signal analyzer to perform different types of processing). Additionally, or alternatively, the signal analyzer may perform different types of processing based on other input, such as based on receiving an issue ticket. For example, the signal analyzer may receive an issue ticket from an issue ticket system associated with a network provider associated with the base station, and the issue ticket may trigger a particular type of processing based on a type of the issue ticket (e.g., as identified from information included in the issue ticket and/or metadata associated with the issue ticket), based on an issue associated with the issue ticket (e.g., as identified from information included in the issue ticket or metadata associated with the ticket), and/or the like.

Additionally, or alternatively, the signal analyzer may perform the different types of processing in a particular order. For example, the signal analyzer may perform the analyzing prior to performing the scanning, and may perform the generating after performing the scanning. Continuing with the previous example, a result of performing the analyzing may be used as input to the scanning, and a result of performing the scanning may be used as input to the generating.

Additionally, or alternatively, the signal analyzer may perform an initial processing (e.g., the analyzing and/or the scanning), and may perform one or more other processing (e.g., the generating) based on a result of the initial processing. Additionally, or alternatively, the signal analyzer may perform different processing based on a user of the signal analyzer (e.g., as determined based on information stored in memory resources of the signal analyzer, security credentials (e.g., a username/password combination, a security token from an identification badge, biometric information, and/or the like) input to the signal analyzer, and/or the like). For example, different technicians may be associated with fixing different issues related to a beamformed wireless signal and/or a base station, and the signal analyzer may perform different types of processing based on the technician using the signal analyzer. In some implementations, the signal analyzer may perform one or more of the processing simultaneously. For example, the signal analyzer may perform the analyzing, the scanning, and/or the generating simultaneously (e.g., where the generating is based on a result of performing the analyzing and/or the scanning).

In some implementations, when performing the processing related to analyzing the frequency converted signal, the signal analyzer may determine a beam index of the frequency converted signal (e.g., a beam index, within a set of signals from the base station, for the frequency converted signal), a beam power of the frequency converted signal (e.g., a beam power in terms of a received signal strength indicator (RSSI), in units of decibels (dBs), and/or the like), a signal-to-noise ratio (SNR) of the frequency converted signal, and/or the like. For example, the signal analyzer may determine the beam index, the beam power, the SNR, and/or the like using a beam reference signal (BRS), a secondary synchronization signal (SSS), and/or the like (e.g., by processing the BRS and/or the SSS, by processing information included in the BRS and/or the SSS, and/or the like).

In some implementations, the signal analyzer may perform the processing related to scanning a channel. For example, the signal analyzer may perform the processing related to scanning the channel after and/or in association with determining the beam index, after performing the processing related to analyzing the frequency converted signal, and/or the like.

In some implementations, when performing the processing related to scanning the channel, the signal analyzer may decode a high-level message associated with the frequency converted signal. For example, the signal analyzer may decode a master information block (MIB) associated with the frequency converted signal. In some implementations, the signal analyzer may decode the high-level message to determine and/or complete a beam profile for the frequency converted signal, as described elsewhere herein. In some implementations, the signal analyzer may decode the high-level message after and/or in association with performing the processing related to the analyzing, and/or the like.

In some implementations, when performing the processing related to the scanning, the signal analyzer may determine a beam quality of the frequency converted signal. For example, the signal analyzer may determine a beam quality of the frequency converted signal after decoding the high-level message, after and/or in association with performing the processing related to the analyzing, based on a result of decoding the MIB, and/or the like. In some implementations, when determining a beam quality of the frequency converted signal, the signal analyzer may perform an error vector magnitude (EVM) measurement on an antenna associated with the signal analyzer, may determine a constellation diagram for the frequency converted signal, and/or the like. For example, the signal analyzer may perform a beamformed broadcast channel EVM measurement. Additionally, or alternatively, and as another example, the signal analyzer may determine a quadrature amplitude modulation (QAM) constellation diagram, a quadrature phase shift keying (QPSK) constellation diagram, and/or the like.

In some implementations, the signal analyzer may perform the processing related to generating the map. For example, the signal analyzer may perform the processing related to generating the map after decoding the high-level message, after determining the beam quality, after performing the processing related to scanning the channel, after performing processing related to analyzing the frequency converted signal, and/or the like.

In some implementations, when performing the processing related to generating the map, the signal analyzer may determine a beam profile for the frequency converted signal. For example, the signal analyzer may determine a cell identifier, a beam index, a beam power, and/or the like for the frequency converted signal. Additionally, or alternatively, when performing the processing related to generating the map, the signal analyzer may perform an estimation of a radio pattern of the base station, a beam pattern of the base station, and/or the like. For example, the signal analyzer may perform the estimation of the radio pattern, the beam pattern, and/or the like after determining the beam profile for the frequency converted signal, in association with determining the beam profile, using the beam profile, and/or the like. In some implementations, performing the estimation may include determining a strength of the frequency converted signal (e.g., an RSSI of the frequency converted signal), determining whether the strength of the frequency converted signal satisfies a threshold, determining a direction from which the frequency converted signal was received (e.g., based on information stored by the signal analyzer that identifies a location of the base station), and/or the like.

Figure 1B:
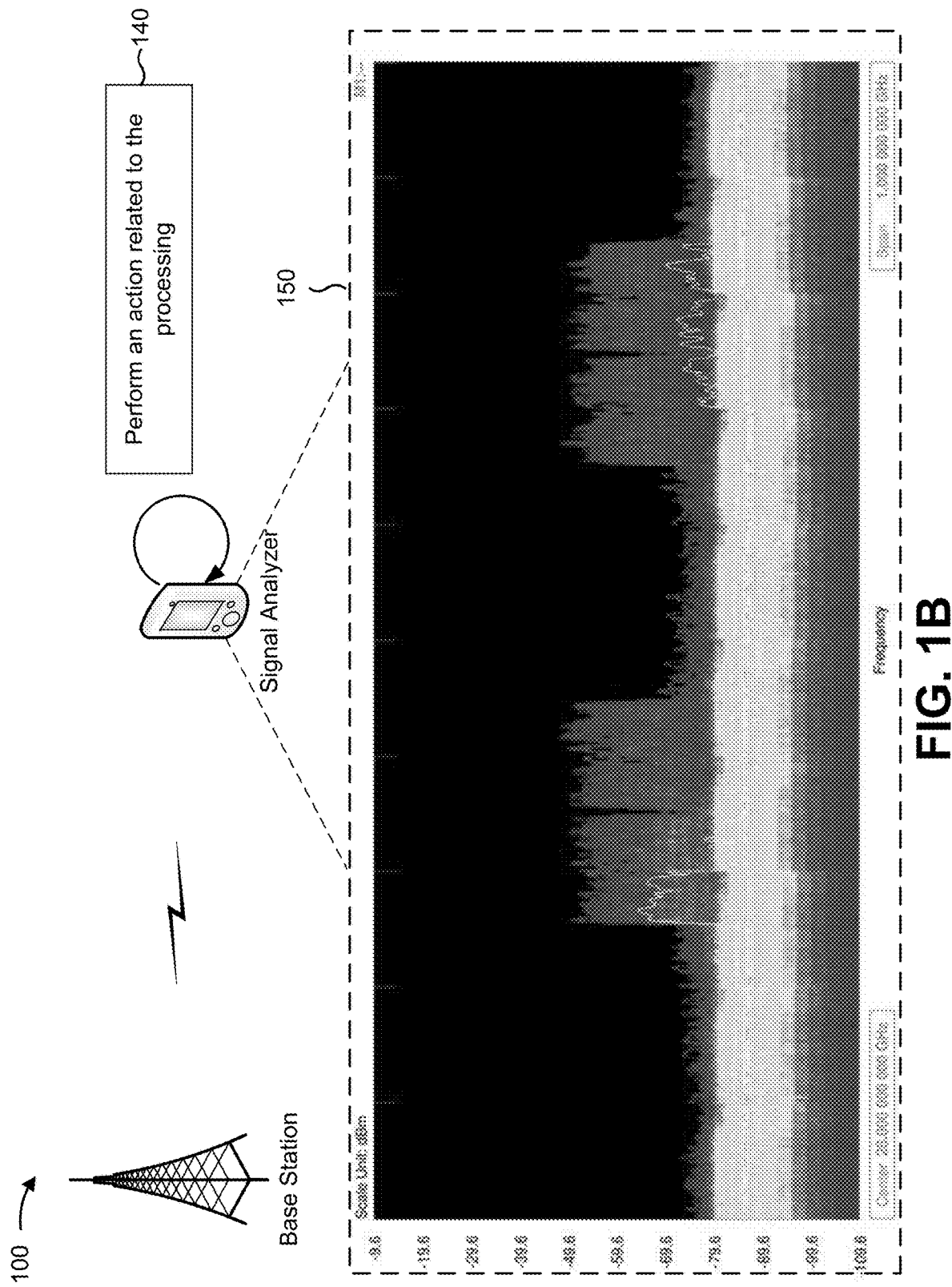

Turning to FIG. 1B, and as shown by reference number 140, the signal analyzer may perform an action related to the processing (e.g., related to the signal processing). For example, the signal analyzer may generate the output after performing the processing, based on input from a user of the signal analyzer to generate the output, according to a schedule, and/or the like. In some implementations, the signal analyzer may provide the output for display via a display associated with the signal analyzer after generating the output, may store the output after generating the output, and/or the like. In some implementations, the signal analyzer may determine a rank related to different frequency converted signals (e.g., based on a respective beam quality of the different frequency converted signals, a respective beam profile of the different frequency converted signals, and/or the like), and may include information that identifies the ranking in output that the signal analyzer generates.

Figure 1C:
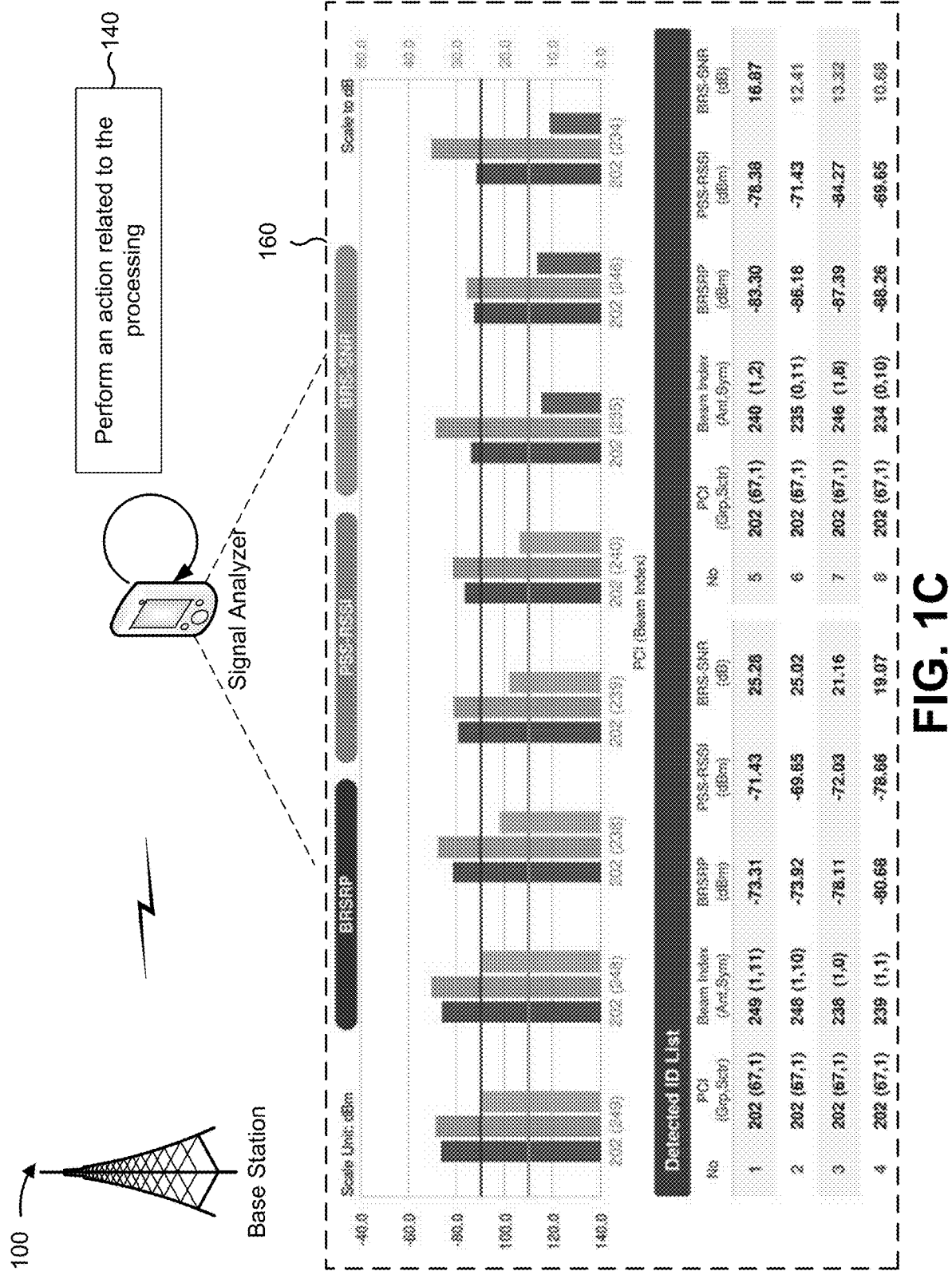

As shown by reference number 150, the signal analyzer may generate first output related to performing the spectrum analysis. For example, the signal analyzer may generate a heat map of one or more frequency converted wireless signals (e.g., that includes information related to the spectrum analysis, such as information that identifies beamformed wireless signals that the signal analyzer received, a frequency of the beamformed wireless signals, a beam power of the beamformed wireless signals, and/or the like). Turning to FIG. 1C, and as shown by reference number 160, the signal analyzer may generate second output related to analyzing the frequency converted signal. For example, the signal analyzer may generate output that includes information that identifies various frequency converted signals (e.g., via inclusion of information that identifies a respective beam index for the various frequency converted signals), a respective beam power for the various frequency converted signals (e.g., a BRS received power (BRSRP), a RSSI, and/or the like), a respective SNR for the various frequency converted signals, and/or the like).

Figure 1D:
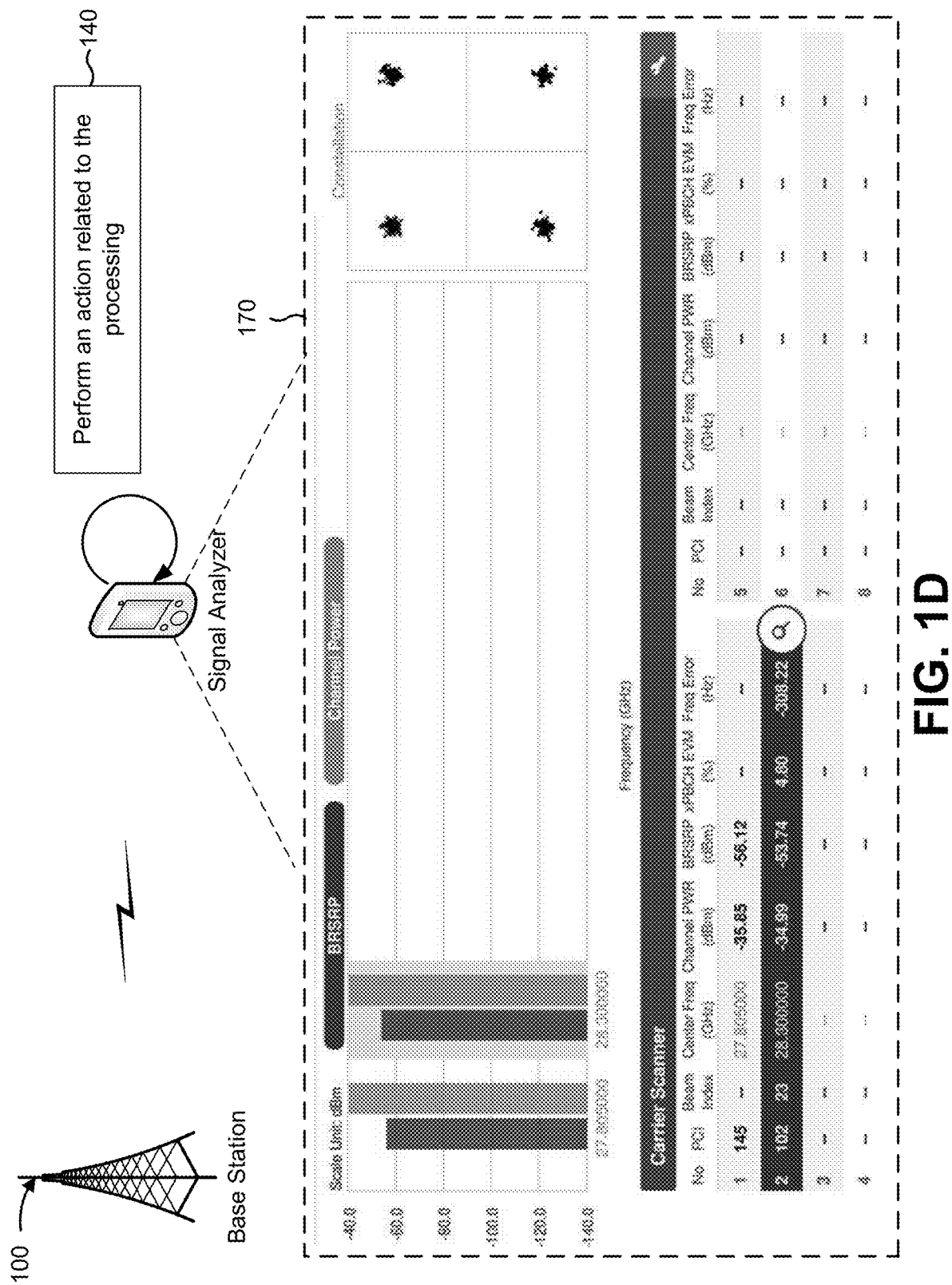
Figure 1E:
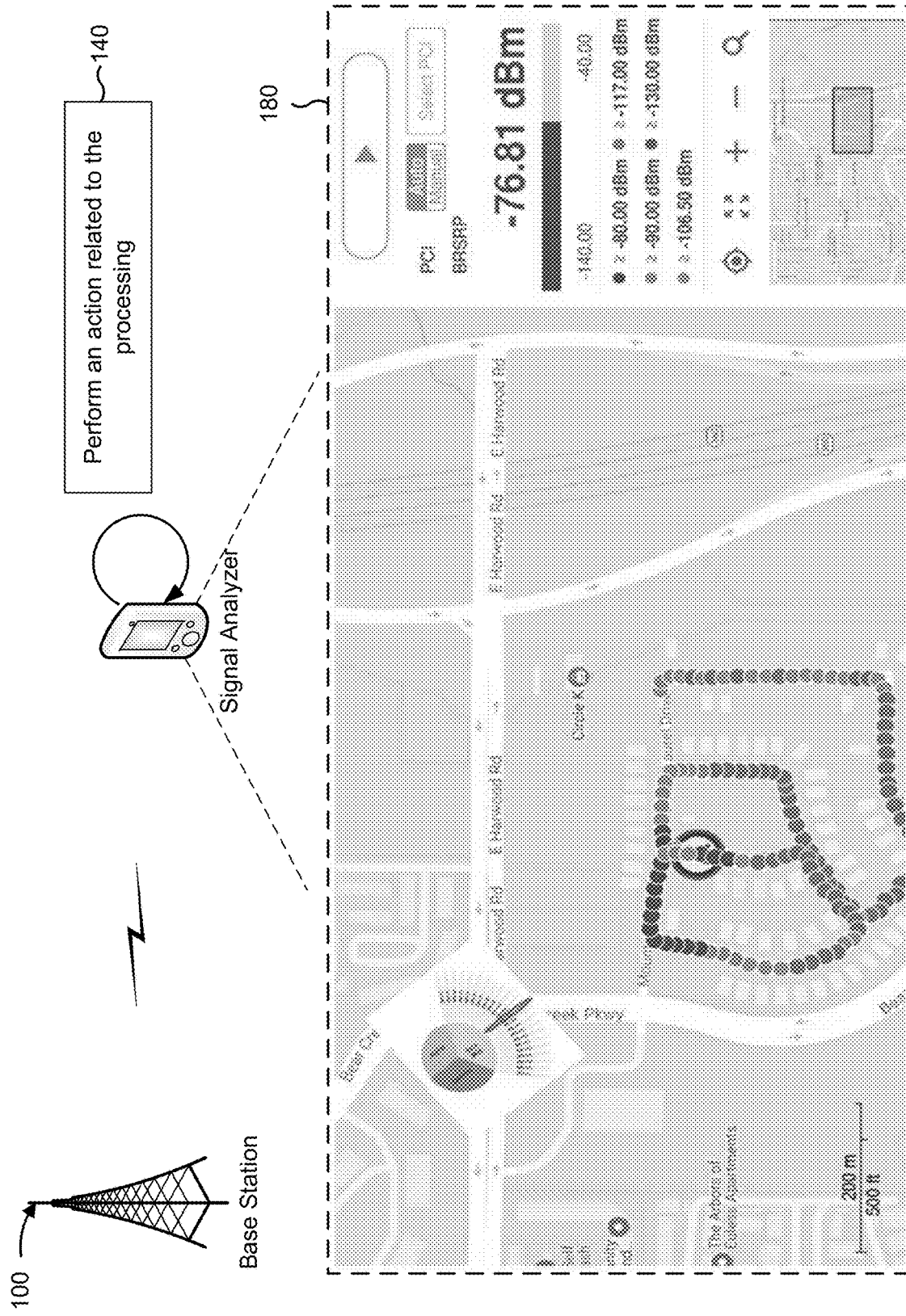

Turning to FIG. 1D, and as shown by reference number 170, the signal analyzer may generate third output related to scanning a channel associated with the frequency converted signal. For example, the signal analyzer may generate output that includes information that identifies a respective BRSRP for various frequency converted signals and/or channels, a respective channel power for various frequency converted signals and/or channels, and/or the like. Turning to FIG. 1E, and as shown by reference number 180, the signal analyzer may generate fourth output. For example, the signal analyzer may generate a map of a location associated with the signal analyzer. Continuing with the previous example, the signal analyzer may include, on the map, information (e.g., icons, labels, and/or the like) that identifies a location of the base station (e.g., as determined from information stored by the signal analyzer, information received from the base station, and/or the like), a beam profile of a frequency converted signal, an estimated radio pattern and/or beam pattern of the base station, and/or the like. Continuing still with the previous example, the signal analyzer may perform measurements of the frequency converted signal (e.g., periodically, according to a schedule, and/or the like) as the signal analyzer is moved about by a user of the signal analyzer, and the signal analyzer may include information related to the measurements on the map (e.g., in real-time or near real-time).

In some implementations, the signal analyzer may determine an issue related to the frequency converted signal and/or a possible cause of the issue. For example, the signal analyzer may identify an issue based on a beam power, a beam SNR, and/or the like associated with the frequency converted signal satisfying a threshold. Continuing with the previous example, the signal analyzer may determine that the failure to satisfy the threshold is a cause of a network performance issue identified in an issue ticket.

Additionally, or alternatively, and as another example, the signal analyzer may determine that an estimation of a radio pattern and/or a beam pattern fails to match an expected estimation of a radio pattern and/or a beam pattern (e.g., when the signal analyzer is within a threshold distance of the base station, as determined from location information that identifies a location of the signal analyzer). Continuing with the previous example, the signal analyzer may determine, based on plotting measurements on the map, that the frequency converted signal is experiencing interference at a particular location and may determine that a structure and/or a land feature, shown on the map, is a possible cause of a network performance issue identified in an issue ticket.

In some implementations, the signal analyzer may output information that identifies the issue and/or the possible cause of the issue for display via a display associated with the signal analyzer. Additionally, or alternatively, the signal analyzer may output the information to another device (e.g., a user device, a server device, and/or the like) by sending a message to the other device. Additionally, or alternatively, the signal analyzer may store the information in memory resources associated with the signal analyzer.

In some implementations, the signal analyzer may perform another type of action based on processing the frequency converted signal. For example, the signal analyzer may automatically cause the base station to act in a particular manner (e.g., may cause the base station to change an orientation of an antenna, to increase or decrease output power, to power on or down, and/or the like).

In this way, the signal analyzer may provide a portable and/or handheld tool that can be used to process a beamformed signal in various ways to facilitate trouble shooting of an issue related to the beamformed wireless signal, to detect an issue related to the beamformed wireless signal, and/or the like. This facilitates improvement of a network performance of a network associated with the beamformed wireless signal, thereby improving communications associated with the network. In addition, this provides a tool that can be quickly and/or easily deployed to a location to analyze a performance of a base station, thereby reducing a cost related to analyzing the performance of the base station and/or increasing an efficiency of analyzing the performance of the base station. Further, this provides a tool that can quickly identify an issue related to a beamformed wireless signal in a manner not previously possible. Further, this facilitates optimization of cell throughput of a cell associated with a base station and/or improved cell planning (e.g., via identification of issues and/or possible causes of issues associated with a beamformed wireless signal transmitted by a base station, with a cell quality and/or coverage at a location, and/or the like). Further, this tool can facilitate reduced costs related to maintaining cell throughput performance by facilitating quick and/or easy deployment to a location and/or analysis of a beamformed wireless signal.

As indicated above, FIGS. 1A-1E are provided merely as an example. Other examples are possible and may differ from what was described with regard to FIGS. 1A-1E. Although some implementations are described in the context of particular concepts, such as BRS, SSS, SNR, RSSI, and/or the like, the implementations apply equally to other concepts, such as synchronization signal and physical broadcast channel block (SSB), reference signal receive power (RSRP), reference signal receive quality (RSRQ), signal-to-interference-plus-noise ratio (SINR), and/or the like.

Figure 2:
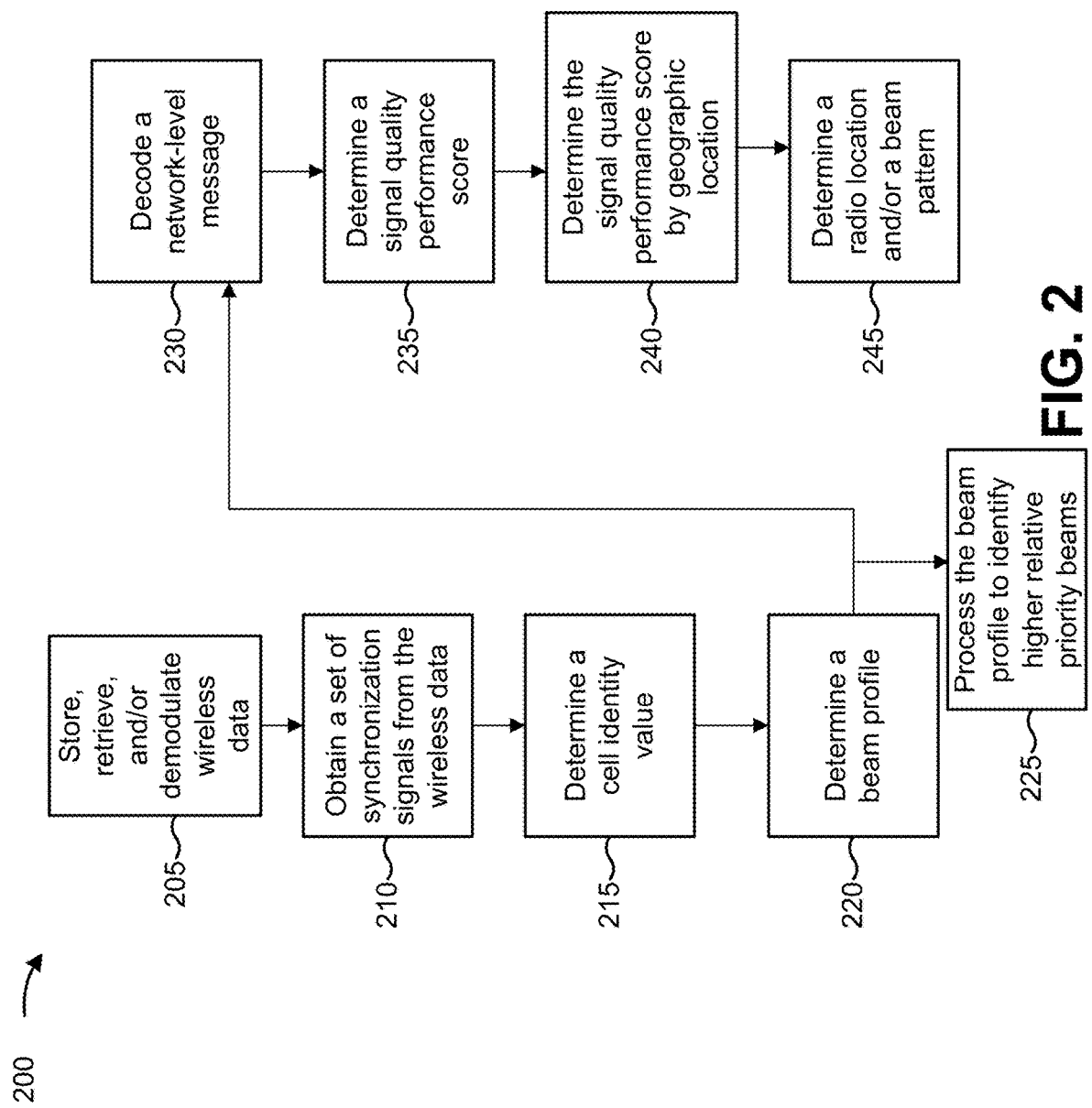
FIG. 2 is a flow chart of an example process for processing a beamformed wireless signal.

FIG. 2 is a flow chart of an example process 200 for processing a beamformed wireless signal. In some implementations, one or more process blocks of FIG. 2 may be performed by a signal analyzer. In some implementations, one or more process blocks of FIG. 2 may be performed by another device or a group of devices separate from or including a signal analyzer, such as a user device, and a server device.

As shown in FIG. 2, process 200 may include storing, retrieving, and/or demodulating wireless data (block 205). For example, the signal analyzer may store, retrieve, and/or demodulate wireless data prior to, or in association with, performing a frequency conversion of the wireless data.

As further shown in FIG. 2, process 200 may include obtaining a set of synchronization signals from the wireless data (block 210). For example, the signal analyzer may obtain a set of synchronization signals (e.g., a primary synchronization signal) by signal processing the wireless data. In some implementations, the signal analyzer may obtain the set of synchronization signals after storing, retrieving, and/or demodulating the wireless data, after frequency converting a beamformed wireless signal, and/or the like.

As further shown in FIG. 2, process 200 may include determining a cell identity value (block 215). For example, the signal analyzer may determine a cell identity value by signal processing the wireless data. In some implementations, a cell identity value may include a PCI, a CGI, a CID, and/or the like. In some implementations, the signal analyzer may determine a cell identity value after obtaining the set of synchronization signals from the wireless data.

As further shown in FIG. 2, process 200 may include determining a beam profile (block 220). For example, the signal analyzer may determine a beam profile by signal processing the wireless data to determine a beam index, a beam power, and/or a beam SNR. In some implementations, the signal analyzer may determine a beam profile to facilitate processing of a frequency converted signal to analyze a frequency converted signal, after determining a cell identity value for the frequency converted signal, and/or the like.

As further shown in FIG. 2, process 200 may include processing the beam profile to identify higher relative priority beams (block 225). For example, the signal analyzer may signal process the beam profile to identify higher relative priority beams based on relative power (e.g., higher relative power), SNR (e.g., higher relative SNR), and/or the like, such as by ranking various beams by power, SNR, and/or the like. In some implementations, the signal analyzer may analyze a frequency converted signal after determining the beam index, the beam power, and/or the beam SNR.

As further shown in FIG. 2, process 200 may include decoding a network-level message (block 230). For example, the signal analyzer may decode a network-level message, such as an MIB, a system information block (SIB), and/or the like, by signal processing the beam profile. In some implementations, the signal analyzer may decode a network-level message after processing the beam profile to identify higher relative priority beams.

As further shown in FIG. 2, process 200 may include determining a signal quality performance score (block 235). For example, the signal analyzer may determine a signal quality performance score that indicates a beam quality of a frequency converted signal by signal processing the wireless data and/or the beam profile. In some implementations, the signal analyzer may determine a signal quality performance score after decoding a network-level message, and/or the like.

As further shown in FIG. 2, process 200 may include determining the signal quality performance score by geographic location (block 240). For example, the signal analyzer may determine the signal quality performance score by geographic location for a frequency converted signal by signal processing the wireless data and/or the beam profile. In some implementations, the signal analyzer may determine a signal quality performance score by geographic location after determining a signal quality performance score, and/or the like.

As shown in FIG. 2, process 200 may include determining a radio location and/or a beam pattern (block 245). For example, the signal analyzer may determine a radio location (e.g., a location of a device transmitting a wireless signal) and/or a beam pattern for a frequency converted signal by signal processing the wireless data and/or the beam profile. In some implementations, the signal analyzer may determine a radio location and/or beam pattern after determining a signal quality performance score by geographic location, and/or the like.

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

Figure 3:
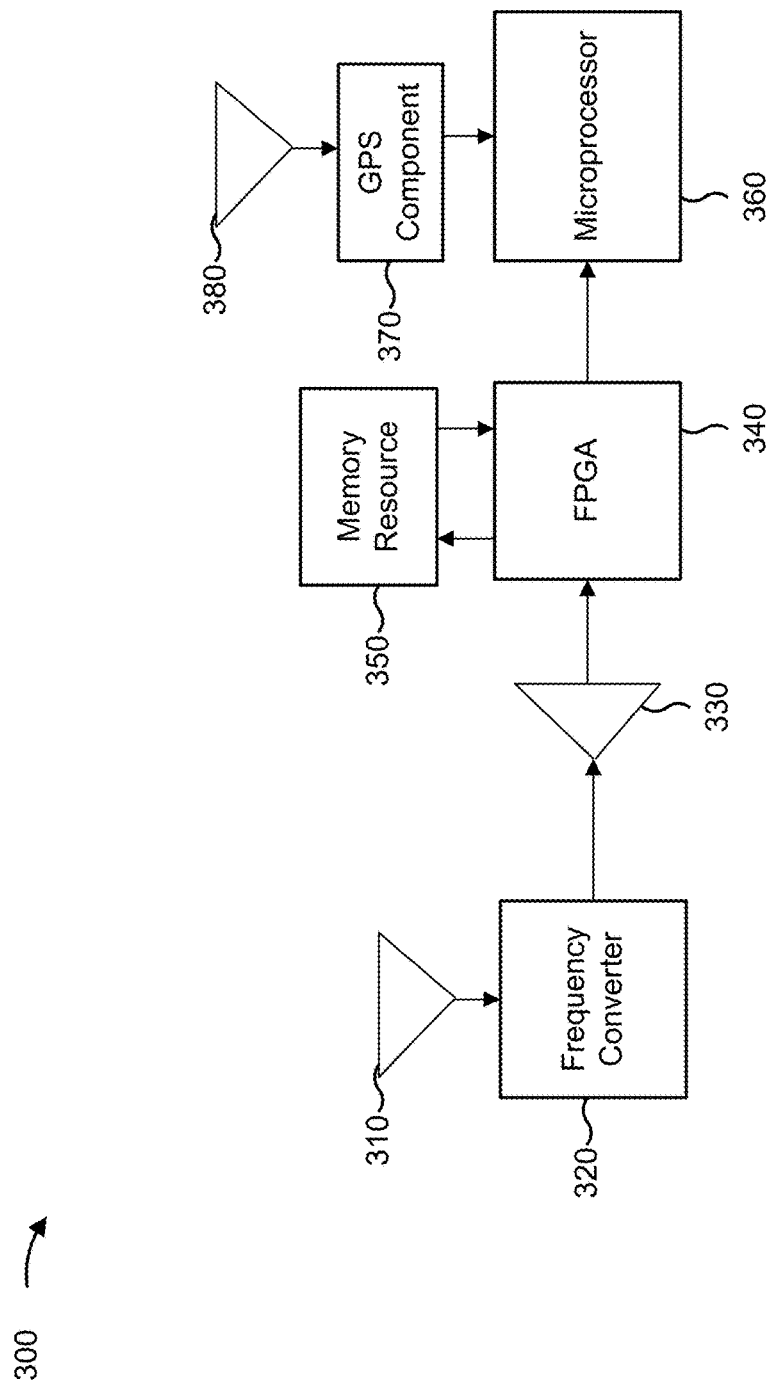
FIG. 3 is a diagram of an example implementation described herein.

FIG. 3 is a diagram of an example implementation 300 described herein. FIG. 3 shows example components of a signal analyzer described herein.

As shown in FIG. 3, and by reference number 310, the signal analyzer may include an antenna. For example, the signal analyzer may include an omnidirectional antenna that the signal analyzer can use to receive a beamformed wireless signal. As shown by reference number 320, the signal analyzer may include a frequency converter. For example, signal analyzer may use the frequency converter to frequency convert a beamformed wireless signal to form a frequency converted signal. In some implementations, the frequency converter may include an oscillator to be used in association with frequency converting the beamformed wireless signal.

As shown by reference number 330, the signal analyzer may include an analog-to-digital converter. For example, the signal analyzer may use the analog-to-digital converter to convert a frequency converted signal from an analog signal to a digital signal. As shown by reference number 340, the signal analyzer may include a field programmable gate array (FPGA). For example, the signal analyzer may use the FPGA to process a frequency converted signal, in a manner that is the same as or similar to that described elsewhere herein. As shown by reference number 350, the signal analyzer may include a memory resource. For example, the signal analyzer may use the memory resource to store information related to the frequency converted signal prior to performing the processing described elsewhere herein, after performing the processing described elsewhere herein, and/or the like.

As shown by reference number 360, the signal analyzer may include a microprocessor. For example, the signal analyzer may use the microprocessor to process a frequency converted signal in a manner that is the same as or similar to that described elsewhere herein. As shown by reference number 370, the signal analyzer may include a global positioning system (GPS) component. For example, the signal analyzer may use the GPS component (e.g., a GPS receiver) to receive a GPS signal (e.g., via a GPS antenna shown by reference number 380). In some implementations, the signal analyzer may use the GPS signal to generate the map (e.g., by correlating information that identifies a location of the signal analyzer with measurements related to the frequency converted signal that the signal analyzer gathered).

As indicated above, FIG. 3 is provided merely as an example. Other examples are possible and may differ from what was described with regard to FIG. 3.

Figure 4:
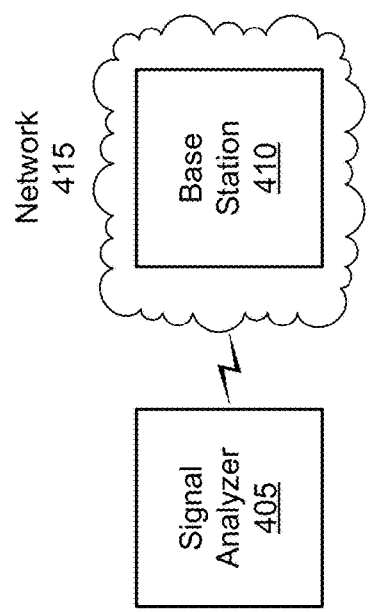
FIG. 4 is a diagram of an example environment in which systems and/or methods, described herein, may be implemented.

FIG. 4 is a diagram of an example environment 400 in which systems and/or methods, described herein, may be implemented. As shown in FIG. 4, environment 400 may include a signal analyzer 405, a base station 410, and a network 415. Devices of environment 400 may interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a third generation (3G) network, a fourth generation (4G) network, a fifth generation (5G) network, etc. Network 415 may include a radio access network (RAN) that includes one or more base stations 410 that take the form of evolved Node Bs (eNBs), next generation Node Bs (gNBs), and/or the like via which signal analyzer 405 communicates.

Signal analyzer 405 includes one or more devices capable of communicating with base station 410 and/or a network (e.g., network 415), such as to perform processing of a beamformed wireless signal. For example, signal analyzer 405 may include a beam scanner, a channel analyzer, a user device, or a similar type of device. In some implementations, signal analyzer 405 may receive a beamformed wireless signal from base station 410, as described elsewhere herein. Additionally, or alternatively, signal analyzer 405 may process the beamformed wireless signal, as described elsewhere herein. In some implementations, a user device may include a mobile phone (e.g., a smartphone or a radiotelephone), a laptop computer, a tablet computer, a gaming device, a wearable communication device (e.g., a smart wristwatch or a pair of smart eyeglasses), or a similar type of device.

Base station 410 includes one or more devices capable of transferring traffic, such as audio, video, text, and/or other traffic, destined for and/or received from signal analyzer 405. In some implementations, base station 410 may include an eNB, a gNB, and/or the like associated with network 415 that receives traffic from and/or sends traffic to network 415. Base station 410 can send traffic to and/or receive traffic from signal analyzer 405 via an air interface. In some implementations, base station 410 may include a small cell base station, such as a base station of a microcell, a picocell, and/or a femtocell.

Network 415 includes one or more wired and/or wireless networks. For example, network 415 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
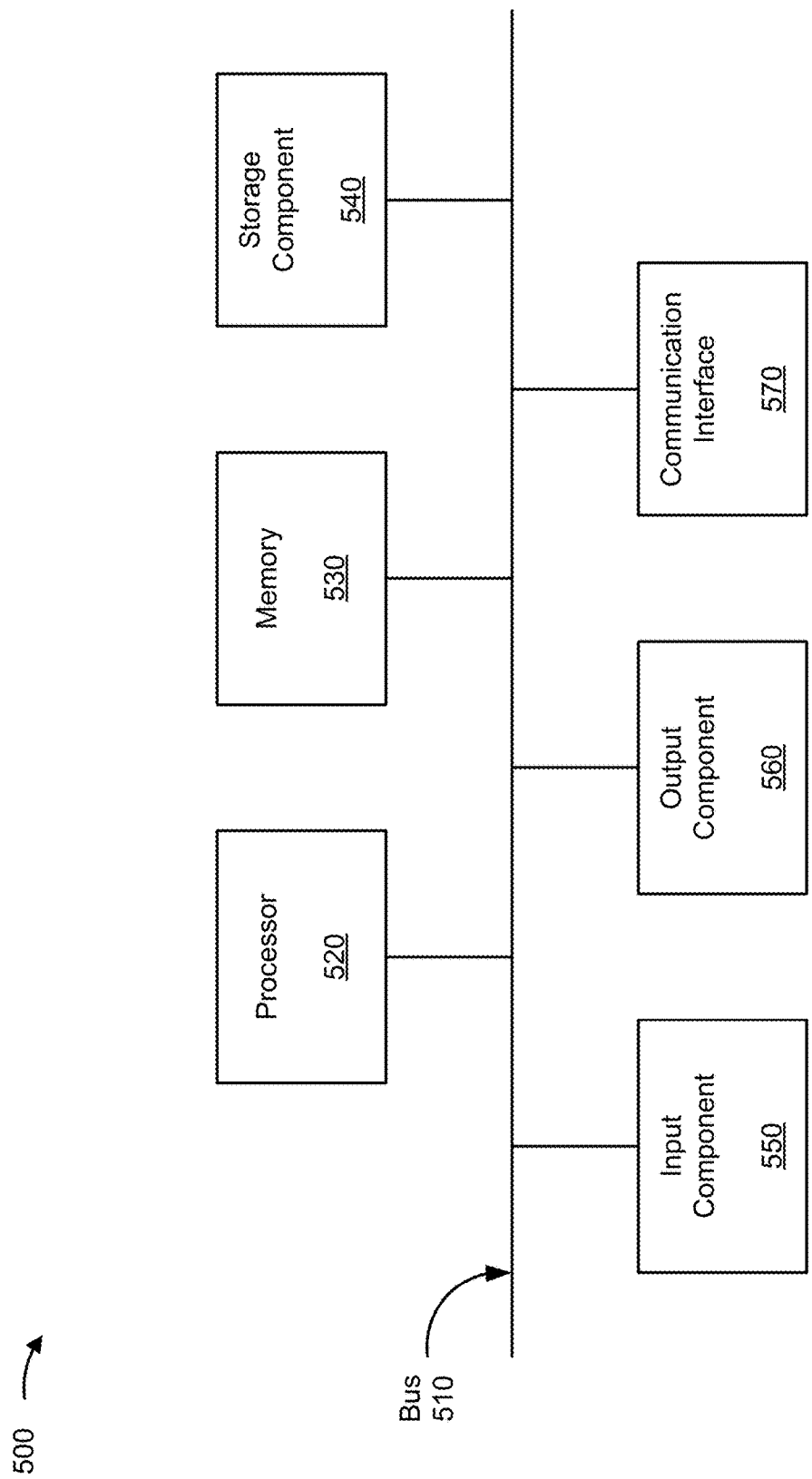
FIG. 5 is a diagram of example components of one or more devices of FIG. 2.

FIG. 5 is a diagram of example components of a device 500. Device 500 may correspond to signal analyzer 405 and/or base station 410. In some implementations, signal analyzer 405 and/or base station 410 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes based on to processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
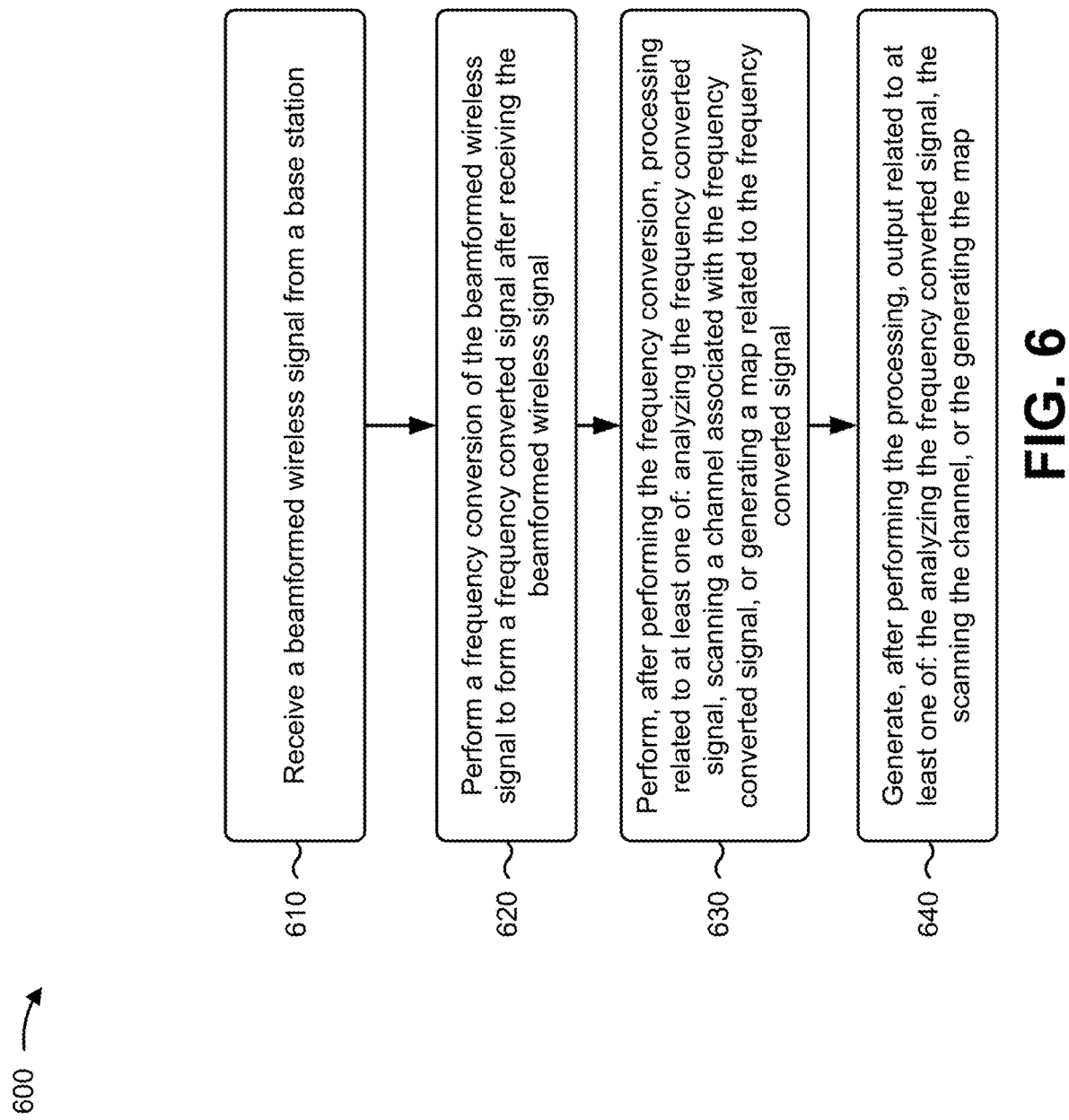
FIG. 6 is a flow chart of an example process for processing a beamformed wireless signal.

FIG. 6 is a flow chart of an example process 600 for processing a beamformed wireless signal. In some implementations, one or more process blocks of FIG. 6 may be performed by a signal analyzer (e.g., signal analyzer 405). In some implementations, one or more process blocks of FIG. 6 may be performed by another device or a group of devices separate from or including the signal analyzer, such as a base station (e.g., base station 410).

As shown in FIG. 6, process 600 may include receiving a beamformed wireless signal from a base station (block 610). For example, the signal analyzer (e.g., signal analyzer 405 using processor 520, input component 550, communication interface 570, and/or the like) may receive a beamformed wireless signal from a base station, in a manner that is the same as or similar to that described elsewhere herein.

As further shown in FIG. 6, process 600 may include performing a frequency conversion of the beamformed wireless signal to form a frequency converted signal after receiving the beamformed wireless signal (block 620). For example, the signal analyzer (e.g., signal analyzer 405 using processor 520, and/or the like) may perform a frequency conversion of the beamformed wireless signal to form a frequency converted signal after receiving the beamformed wireless signal, in a manner that is the same as or similar to that described elsewhere herein.

As further shown in FIG. 6, process 600 may include performing, after performing the frequency conversion, processing related to at least one of: analyzing the frequency converted signal, scanning a channel associated with the frequency converted signal, or generating a map related to the frequency converted signal (block 630). For example, the signal analyzer (e.g., signal analyzer 405 using processor 520, and/or the like) may perform, after performing the frequency conversion, processing related to at least one of: analyzing the frequency converted signal, scanning a channel associated with the frequency converted signal, or generating a map related to the frequency converted signal, in a manner that is the same as or similar to that described elsewhere herein.

As further shown in FIG. 6, process 600 may include generating, after performing the processing, output related to at least one of: the analyzing the frequency converted signal, the scanning the channel, or the generating the map (block 640). For example, the signal analyzer (e.g., signal analyzer 405 using processor 520, memory 530, storage component 540, output component 560, communication interface 570, and/or the like) may generate, after performing the processing, output related to at least one of: the analyzing the frequency converted signal, the scanning the channel, or the generating the map, in a manner that is the same as or similar to that described elsewhere herein.

Process 600 may include additional implementations, such as any single implementation or any combination of implementations described below and/or in connection with one or more other processes described elsewhere herein.

In some implementations, the signal analyzer may determine a primary synchronization of the frequency converted signal after performing the frequency conversion, and may perform the processing after determining the primary synchronization of the frequency converted signal. In some implementations, the signal analyzer may determine a cell identifier of a cell associated with the frequency converted signal after determining the primary synchronization of the frequency converted signal, and may perform the processing after determining the cell identifier of the cell.

In some implementations, the signal analyzer may determine at least one of: a beam index of the frequency converted signal, a beam power of the frequency converted signal, or a signal-to-noise ratio (SNR) of the frequency converted signal, and may generate the output related to the frequency converted signal after determining the at least one of: the beam index, the beam power, or the SNR. In some implementations, the signal analyzer may decode a high-level message associated with the frequency converted signal after determining the at least one of: the beam index, the beam power, or the SNR.

In some implementations, the signal analyzer may determine a channel power and a beam quality of the frequency converted signal after decoding the high-level message, and may generate the output related to scanning the channel after determining the channel power and the beam quality. In some implementations, the signal analyzer may determine a beam profile for the frequency converted signal after performing the frequency conversion, may perform an estimation of a radio pattern or a beam pattern of the base station after determining the beam profile, and may generate the output related to generating the map based on the beam profile or based on at least one of the radio pattern or the beam pattern.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
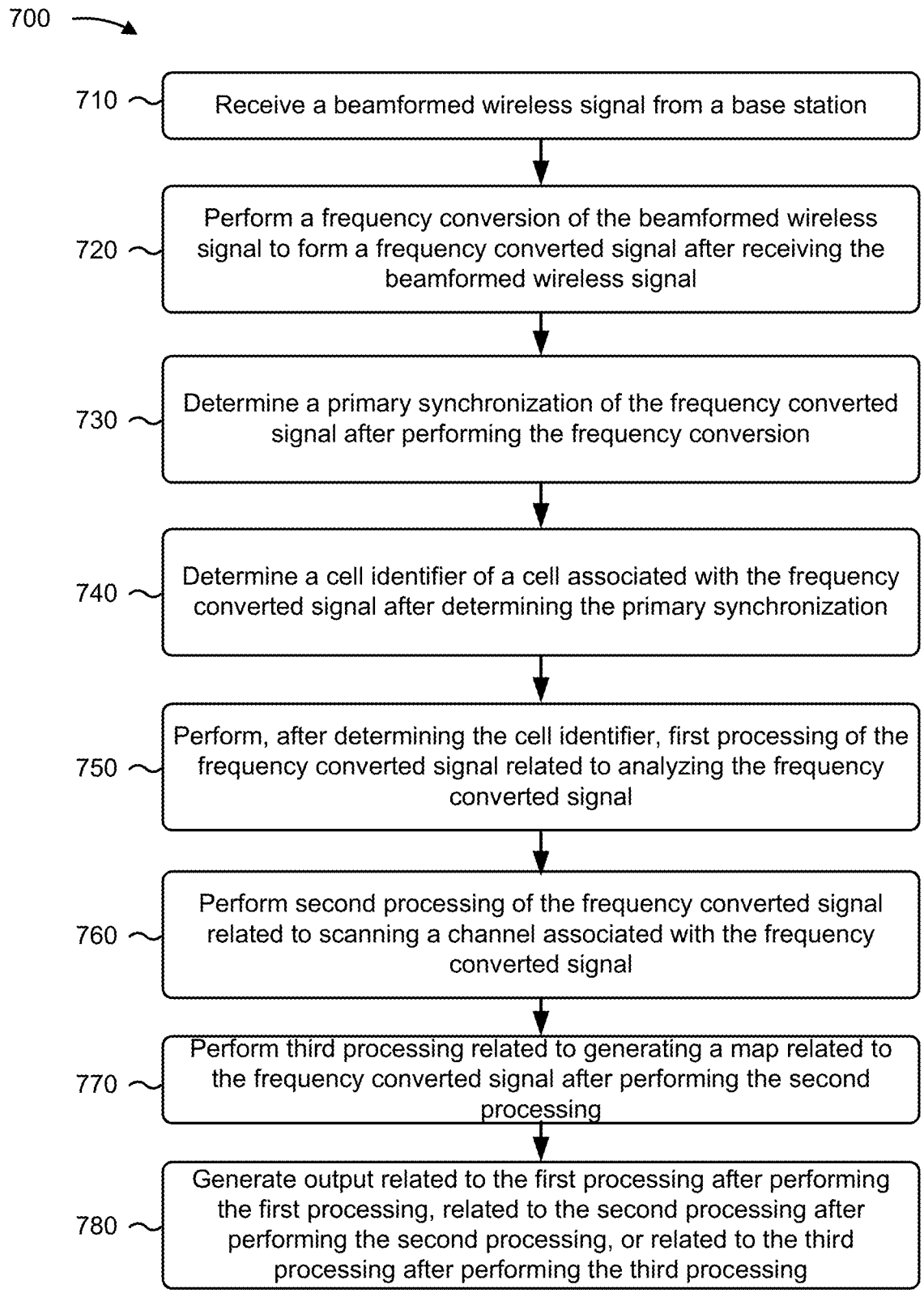
FIG. 7 is a flow chart of an example process for processing a beamformed wireless signal.

FIG. 7 is a flow chart of an example process 700 for processing a beamformed wireless signal. In some implementations, one or more process blocks of FIG. 7 may be performed by a signal analyzer (e.g., signal analyzer 405). In some implementations, one or more process blocks of FIG. 7 may be performed by another device or a group of devices separate from or including the signal analyzer, such as a base station (e.g., base station 410).

As shown in FIG. 7, process 7 00 may include receiving a beamformed wireless signal from a base station (block 710). For example, the signal analyzer (e.g., signal analyzer 405 using processor 520, input component 550, communication interface 570, and/or the like) may receive a beamformed wireless signal from a base station, in a manner that is the same as or similar to that described elsewhere herein.

As further shown in FIG. 7, process 700 may include performing a frequency conversion of the beamformed wireless signal to form a frequency converted signal after receiving the beamformed wireless signal (block 720). For example, the signal analyzer (e.g., signal analyzer 405 using processor 520, and/or the like) may perform a frequency conversion of the beamformed wireless signal to form a frequency converted signal after receiving the beamformed wireless signal, in a manner that is the same as or similar to that described elsewhere herein.

As further shown in FIG. 7, process 700 may include determining a primary synchronization of the frequency converted signal after performing the frequency conversion (block 730). For example, the signal analyzer (e.g., signal analyzer 405 using processor 520, and/or the like) may determine a primary synchronization of the frequency converted signal after performing the frequency conversion, in a manner that is the same as or similar to that described elsewhere herein.

As further shown in FIG. 7, process 700 may include determining a cell identifier of a cell associated with the frequency converted signal after determining the primary synchronization (block 740). For example, the signal analyzer (e.g., signal analyzer 405 using processor 520, and/or the like) may determine a cell identifier of a cell associated with the frequency converted signal after determining the primary synchronization, in a manner that is the same as or similar to that described elsewhere herein.

As further shown in FIG. 7, process 700 may include performing, after determining the cell identifier, first processing of the frequency converted signal related to analyzing the frequency converted signal (block 750). For example, the signal analyzer (e.g., signal analyzer 405 using processor 520, and/or the like) may perform, after determining the cell identifier, first processing of the frequency converted signal related to analyzing the frequency converted signal, in a manner that is the same as or similar to that described elsewhere herein.

As further shown in FIG. 7, process 700 may include performing second processing of the frequency converted signal related to scanning a channel associated with the frequency converted signal (block 760). For example, the signal analyzer (e.g., signal analyzer 405 using processor 520, and/or the like) may perform second processing of the frequency converted signal related to scanning a channel associated with the frequency converted signal, in a manner that is the same as or similar to that described elsewhere herein.

As further shown in FIG. 7, process 700 may include performing third processing related to generating a map related to the frequency converted signal after performing the second processing (block 770). For example, the signal analyzer (e.g., signal analyzer 405 using processor 520, and/or the like) may perform third processing related to generating a map related to the frequency converted signal after performing the second processing, in a manner that is the same as or similar to that described elsewhere herein.

As further shown in FIG. 7, process 700 may include generating output related to the first processing after performing the first processing, related to the second processing after performing the second processing, or related to the third processing after performing the third processing (block 780). For example, the signal analyzer (e.g., signal analyzer 405 using processor 520, memory 530, storage component 540, output component 560, communication interface 570, and/or the like) may generate output related to the first processing after performing the first processing, related to the second processing after performing the second processing, or related to the third processing after performing the third processing, in a manner that is the same as or similar to that described elsewhere herein.

Process 700 may include additional implementations, such as any single implementation or any combination of implementations described below and/or in connection with one or more other processes described elsewhere herein.

In some implementations, the signal analyzer may receive the beamformed wireless signal via an omnidirectional antenna associated with the device. In some implementations, the signal analyzer may perform the frequency conversion using a frequency converter associated with the device.

In some implementations, the signal analyzer may perform the first processing, the second processing, or the third processing using a field-programmable gate array (FPGA) associated with the device or a microprocessor associated with the device. In some implementations, the signal analyzer may generate the output based on at least one of: a beam index associated with the frequency converted signal, a beam power of the frequency converted signal, or a signal-to-noise (SNR) of the frequency converted signal.

In some implementations, the signal analyzer may generate the output related to the second processing based on a beam quality of the frequency converted signal. In some implementations, the signal analyzer may generate the output related to the third processing based on at least one of: a beam profile of the frequency converted signal, an estimated radio pattern of the base station, or an estimated beam pattern of the base station.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
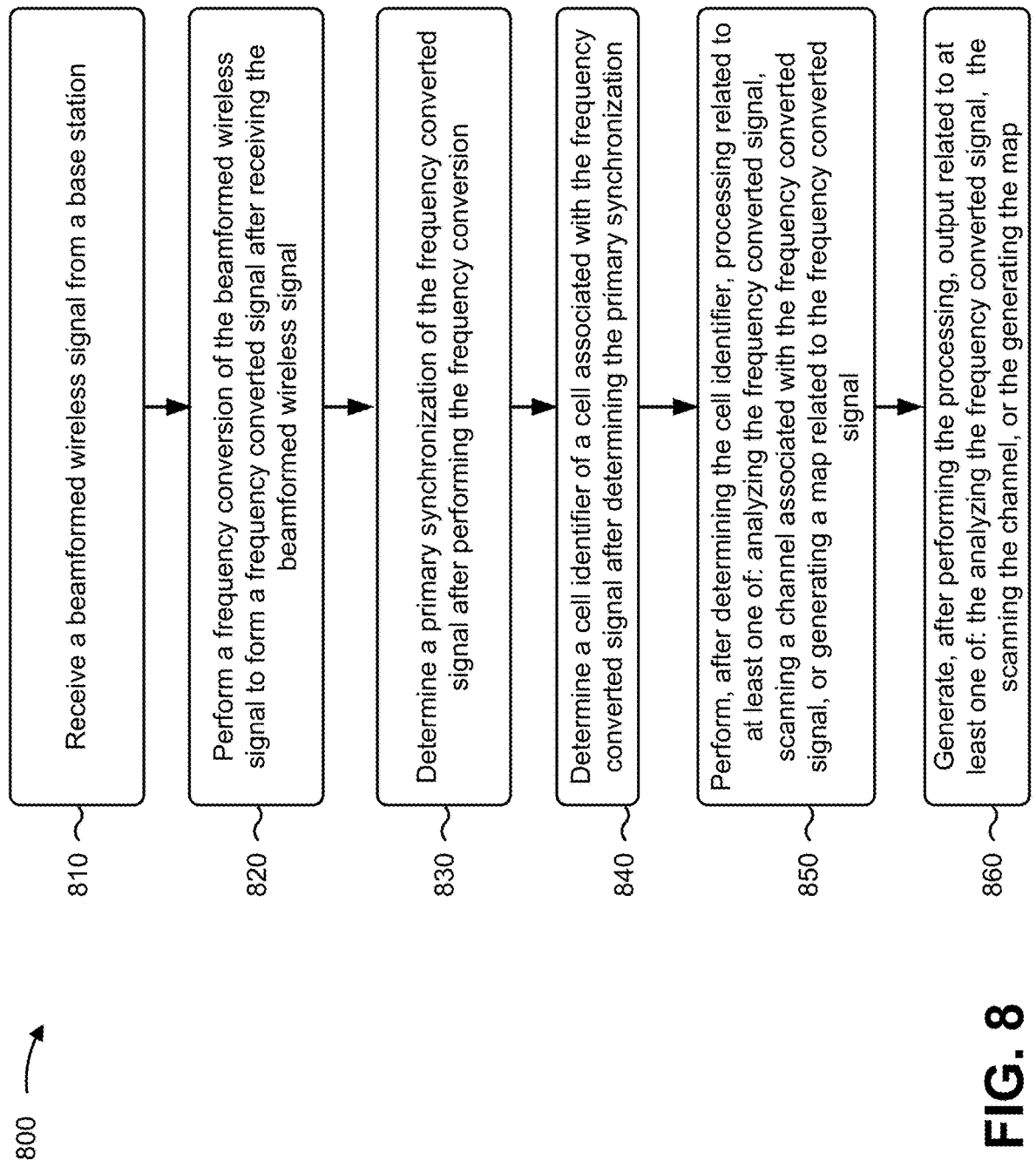
FIG. 8 is a flow chart of an example process for processing a beamformed wireless signal.

FIG. 8 is a flow chart of an example process 800 for processing a beamformed wireless signal. In some implementations, one or more process blocks of FIG. 8 may be performed by a signal analyzer (e.g., signal analyzer 405). In some implementations, one or more process blocks of FIG. 8 may be performed by another device or a group of devices separate from or including the signal analyzer, such as a base station (e.g., base station 410).

As shown in FIG. 8, process 800 may include receiving a beamformed wireless signal from a base station (block 810). For example, the signal analyzer (e.g., signal analyzer 405 using processor 520, input component 550, communication interface 570, and/or the like) may receive a beamformed wireless signal from a base station, in a manner that is the same as or similar to that described elsewhere herein.

As further shown in FIG. 8, process 800 may include performing a frequency conversion of the beamformed wireless signal to form a frequency converted signal after receiving the beamformed wireless signal (block 820). For example, the signal analyzer (e.g., signal analyzer 405 using processor 520) may perform a frequency conversion of the beamformed wireless signal to form a frequency converted signal after receiving the beamformed wireless signal, in a manner that is the same as or similar to that described elsewhere herein.

As further shown in FIG. 8, process 800 may include determining a primary synchronization of the frequency converted signal after performing the frequency conversion (block 830). For example, the signal analyzer (e.g., signal analyzer 405 using processor 520, and/or the like) may determine a primary synchronization of the frequency converted signal after performing the frequency conversion, in a manner that is the same as or similar to that described elsewhere herein.

As further shown in FIG. 8, process 800 may include determining a cell identifier of a cell associated with the frequency converted signal after determining the primary synchronization (block 840). For example, the signal analyzer (e.g., signal analyzer 405 using processor 520, and/or the like) may determine a cell identifier of a cell associated with the frequency converted signal after determining the primary synchronization, in a manner that is the same as or similar to that described elsewhere herein.

As further shown in FIG. 8, process 800 may include performing, after determining the cell identifier, processing related to at least one of: analyzing the frequency converted signal, scanning a channel associated with the frequency converted signal, or generating a map related to the frequency converted signal (block 850). For example, the signal analyzer (e.g., signal analyzer 405 using processor 520, and/or the like) may perform, after determining the cell identifier, processing related to at least one of: analyzing the frequency converted signal, scanning a channel associated with the frequency converted signal, or generating a map related to the frequency converted signal, in a manner that is the same as or similar to that described elsewhere herein.

As further shown in FIG. 8, process 800 may include generating, after performing the processing, output related to at least one of: the analyzing the frequency converted signal, the scanning the channel, or the generating the map (block 860). For example, the signal analyzer (e.g., signal analyzer 405 using processor 520, memory 530, storage component 540, output component 560, communication interface 570, and/or the like) may generate, after performing the processing, output related to at least one of: the analyzing the frequency converted signal, the scanning the channel, or the generating the map, in a manner that is the same as or similar to that described elsewhere herein.

Process 800 may include additional implementations, such as any single implementation or any combination of implementations described below and/or in connection with one or more other processes described elsewhere herein.

In some implementations, the signal analyzer may perform a spectrum analysis of the beamformed wireless signal after performing the frequency conversion, and may determine the primary synchronization after performing the spectrum analysis. In some implementations, the signal analyzer may perform the frequency conversion from a first frequency domain to a second frequency domain, wherein the second frequency domain is a lower frequency domain relative to the first frequency domain.

In some implementations, the signal analyzer may perform an analog-to-digital conversion of the frequency converted signal after performing the frequency conversion. In some implementations, the signal analyzer may store information related to the frequency converted signal in a memory resource prior to performing the processing. In some implementations, the signal analyzer may perform the processing using the information after storing the information in the memory resource.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, a beamformed wireless signal from a base station;
performing, by the device, a frequency conversion of the beamformed wireless signal to form a frequency converted signal after receiving the beamformed wireless signal;
determining, by the device and after performing the frequency conversion, a cell identifier of a cell associated with the frequency converted signal;
performing, by the device and after determining the cell identifier, processing related to at least one of:
analyzing the frequency converted signal,
scanning a channel associated with the frequency converted signal, or
generating a map related to the frequency converted signal;
determining, by the device and after performing the frequency conversion, a beam profile for the frequency converted signal; and
generating, by the device, based on the beam profile, and after performing the processing, output related to at least one of:
the analyzing the frequency converted signal,
the scanning the channel, or
the generating the map.

2. The method of claim 1, further comprising:
determining a primary synchronization of the frequency converted signal after performing the frequency conversion; and
wherein performing the processing comprises:
performing the processing after determining the primary synchronization of the frequency converted signal.

3. The method of claim 1, wherein performing the processing related to analyzing the frequency converted signal comprises:
determining at least one of:
a beam index of the frequency converted signal,
a beam power of the frequency converted signal, or
a signal-to-noise ratio (SNR) of the frequency converted signal; and
wherein generating the output related to analyzing the frequency converted signal comprises:
generating the output related to the frequency converted signal after determining the at least one of:
the beam index,
the beam power, or
the SNR.

4. The method of claim 1, wherein performing the processing related to generating the map comprises:
performing an estimation of a radio pattern or a beam pattern of the base station after determining the beam profile; and
wherein generating the output related to generating the map comprises:
generating the output related to generating the map based on the beam profile or based on at least one of the radio pattern or the beam pattern.

5. The method of claim 1, wherein performing the frequency conversion comprises modifying a frequency of the beamformed wireless signal while maintaining at least one of a phase or an amplitude of the beamformed wireless signal.

6. The method of claim 3, further comprising:
decoding a high-level message associated with the frequency converted signal after determining the at least one of:
the beam index,
the beam power, or
the SNR.

7. The method of claim 6, wherein performing the processing related to scanning the channel comprises:
determining a channel power and a beam quality of the frequency converted signal after decoding the high-level message; and
wherein generating the output related to scanning the channel comprises:
generating the output related to scanning the channel after determining the channel power and the beam quality.

8. A device, comprising:
one or more memories; and
one or more processors, communicatively coupled to the one or more memories, configured to:
receive a beamformed wireless signal from a base station;
perform a frequency conversion of the beamformed wireless signal to form a frequency converted signal after receiving the beamformed wireless signal;
determine a primary synchronization of the frequency converted signal after performing the frequency conversion;
determine a cell identifier of a cell associated with the frequency converted signal after performing the frequency conversion and after determining the primary synchronization;
perform, after determining the cell identifier, first processing of the frequency converted signal related to analyzing the frequency converted signal;
perform second processing of the frequency converted signal related to scanning a channel associated with the frequency converted signal;
perform third processing related to generating a map related to the frequency converted signal after performing the second processing;
determine, after performing the frequency conversion, a beam profile for the frequency converted signal; and
generate, based on the beam profile, output related to the first processing after performing the first processing, related to the second processing after performing the second processing, or related to the third processing after performing the third processing.

9. The device of claim 8, wherein the one or more processors, when receiving the beamformed wireless signal, are configured to:
receive the beamformed wireless signal via an omnidirectional antenna associated with the device.

10. The device of claim 8, wherein the one or more processors, when performing the frequency conversion, are configured to:

perform the frequency conversion using a frequency converter associated with the device.

11. The device of claim 8, wherein the one or more processors, when performing the first processing, the second processing, or the third processing, are configured to:
perform the first processing, the second processing, or the third processing using a field-programmable gate array (FPGA) associated with the device or a microprocessor associated with the device.

12. The device of claim 8, wherein the one or more processors, when generating the output related to the first processing, are configured to:
generate the output based on at least one of:
a beam index associated with the frequency converted signal,
a beam power of the frequency converted signal, or
a signal-to-noise (SNR) of the frequency converted signal.

13. The device of claim 8, wherein the one or more processors, when generating the output related to the second processing, are configured to:
generate the output related to the second processing based on a beam quality of the frequency converted signal.

14. The device of claim 8, wherein the one or more processors, when generating the output related to the third processing, are configured to:
generate the output related to the third processing based on at least one of:
the beam profile,
an estimated radio pattern of the base station, or
an estimated beam pattern of the base station.

15. A non-transitory computer-readable medium storing instructions, the instructions comprising:
one or more instructions that, when executed by one or more processors, cause the one or more processors to:
receive a beamformed wireless signal from a base station;
perform a frequency conversion of the beamformed wireless signal to form a frequency converted signal after receiving the beamformed wireless signal;
determine a primary synchronization of the frequency converted signal after performing the frequency conversion;
determine a cell identifier of a cell associated with the frequency converted signal after performing the frequency conversion and after determining the primary synchronization;
perform, after determining the cell identifier, processing related to at least one of:
analyzing the frequency converted signal,
scanning a channel associated with the frequency converted signal, or
generating a map related to the frequency converted signal;
determine, after performing the frequency conversion, a beam profile for the frequency converted signal; and
generate, after performing the processing and based on the beam profile, output related to at least one of:
the analyzing the frequency converted signal,
the scanning the channel, or
the generating the map.

16. The non-transitory computer-readable medium of claim 15, wherein the one or more instructions, when executed by the one or more processors, further cause the one or more processors to:
perform a spectrum analysis of the beamformed wireless signal after performing the frequency conversion; and
wherein the one or more instructions, that cause the one or more processors to determine the primary synchronization, cause the one or more processors to:
determine the primary synchronization after performing the spectrum analysis.

17. The non-transitory computer-readable medium of claim 15, wherein the one or more instructions, that cause the one or more processors to perform the frequency conversion, cause the one or more processors to:
perform the frequency conversion from a first frequency domain to a second frequency domain,
wherein the second frequency domain is a lower frequency domain relative to the first frequency domain.

18. The non-transitory computer-readable medium of claim 15, wherein the one or more instructions, when executed by the one or more processors, further cause the one or more processors to:
perform an analog-to-digital conversion of the frequency converted signal after performing the frequency conversion.

19. The non-transitory computer-readable medium of claim 15, wherein the one or more instructions, when executed by the one or more processors, further cause the one or more processors to:
store information related to the frequency converted signal in a memory resource prior to performing the processing.

20. The non-transitory computer-readable medium of claim 19, wherein the one or more instructions, that cause the one or more processors to perform the processing, cause the one or more processors to:
perform the processing using the information after storing the information in the memory resource.

* * * * *